(No Model.)
2 Sheets—Sheet 2.
J. H. FOX.
POWER DRIVER FOR BICYCLES.
No. 587,806. Patented Aug. 10, 1897.
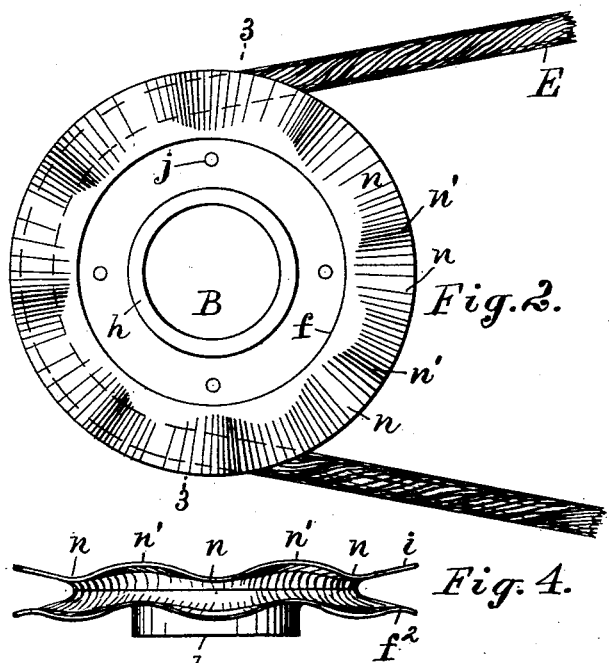
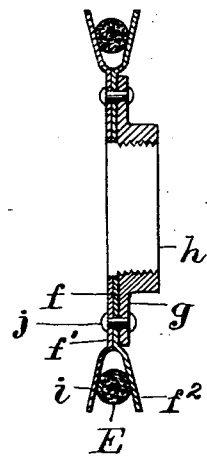
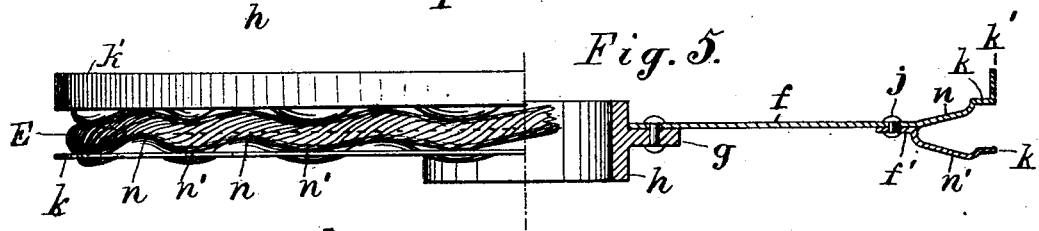
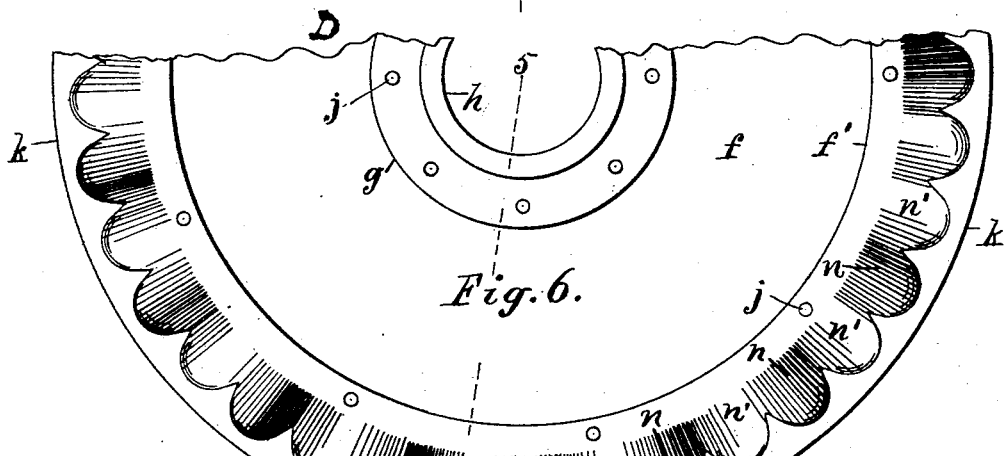
Attest:
L. Lee.
Edw. F. Kinney.
Inventor
John H. Fox, per
Thomas S. Crane, Atty.

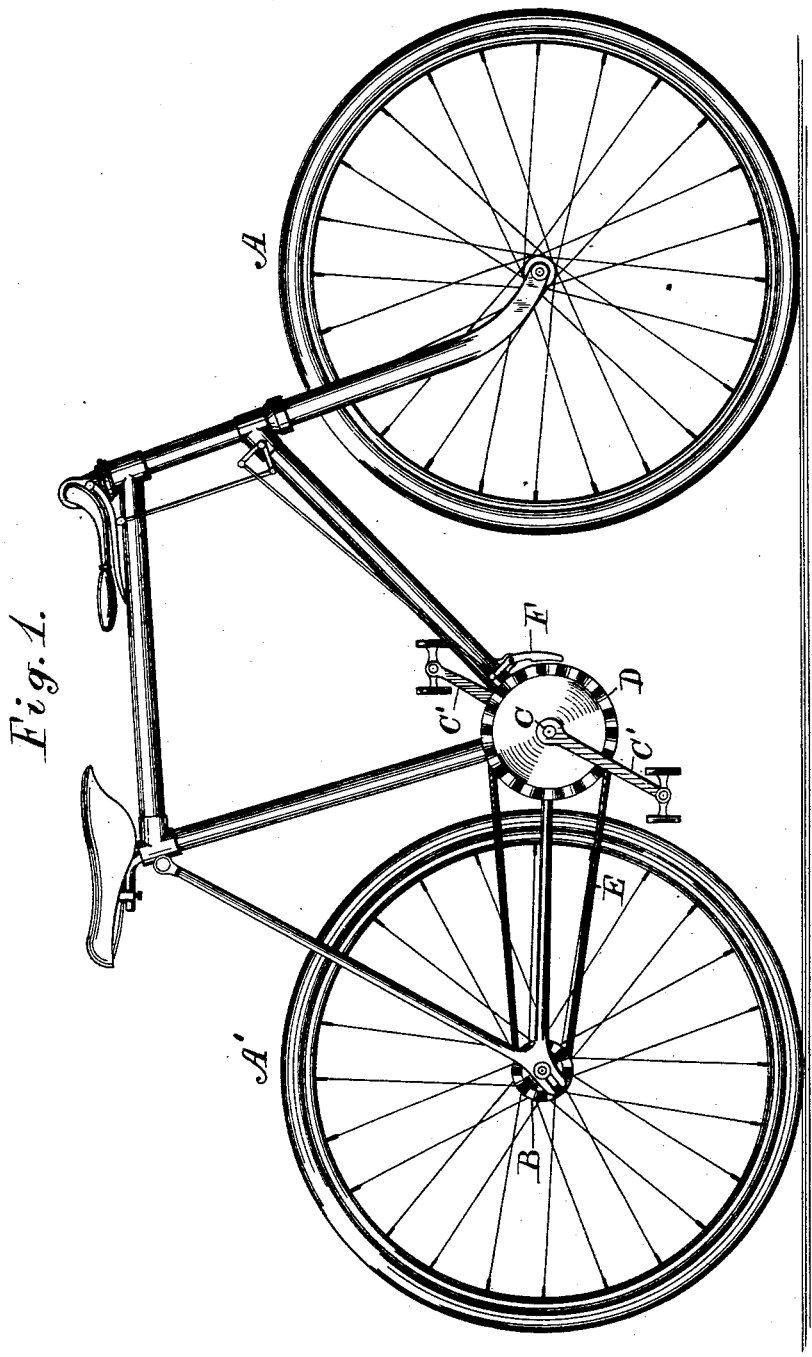

UNITED STATES PATENT OFFICE.

JOHN H. FOX, OF NEW YORK, N. Y.

POWER-DRIVER FOR BICYCLES.

SPECIFICATION forming part of Letters Patent No. 587,806, dated August 10, 1897.

Application filed March 13, 1896. Serial No. 583,031. (No model.)

*To all whom it may concern:*

Be it known that I, JOHN H. FOX, a citizen of the United States, residing at New York, county of New York, State of New York, have invented certain new and useful Improvements in Power-Drivers for Bicycle and other Wheels, fully described and represented in the following specification and the accompanying drawings, forming a part of the same.

The object of this invention is to obviate the use of a chain in connecting the crank-shaft with the driving-wheel of a bicycle by using a flexible cord and grooved cord-wheels; and the invention consists in a particular construction for the wheels which are employed to carry an endless cord. To secure great lightness with the requisite strength, I form the flanges of the cord-wheels of two thin sheet-metal corrugated rings, connecting the rings of the smaller cord-wheel with a hub threaded internally to fit upon the ball-bearing sleeve of the driven wheel and making one of the rings for the larger cord-wheel integral with a disk or plate which is riveted to a hub on the bicycle crank-shaft. The corrugations are formed upon the rings by stamping alternate ridges and hollows thereon and in the larger wheel pressing such ridges and hollows within the margin of the ring, so that the periphery of the ring may run true. To avoid straining the sheet metal, I press the ridges and hollows partly upon each side of the flat metal of which the ring is formed, so that they project upon the outer side of the ring as well as upon the inner side. One of the rings upon the larger wheel is formed with a laterally-projecting cylindrical guard adapted to receive a brake-shoe, such guard being formed of the sheet metal integral with the adjacent ring.

The invention will be understood by reference to the annexed drawings, in which—

Figure 1 is a side elevation of a bicycle provided with my improved driving appliances. Fig. 2 is a side elevation of the smaller cord-wheel with part of the cord. Fig. 3 is a transverse section of the wheel on line 3 3 in Fig. 2 where the channel is central upon the disk of the wheel. Fig. 4 is an edge view of the smaller wheel. Fig. 5 is an edge view of the crank-shaft wheel with the cord fitted to the rim upon one side of the center line and the wheel shown in section at the opposite side of the center line upon line 5 5 in Fig. 6 where the channel is bent to one side of the wheel-disk. Fig. 6 is a side view of the crank-shaft wheel with one edge broken away for want of room upon the drawings.

In Fig. 1, A designates the steering-wheel, and A' the driving-wheel, having the cord-wheel B attached to its hub where the small sprocket-wheel is usually secured. C designates the crank-shaft, carrying the crank C' and the crank-shaft cord-wheel D. E designates the endless cord, which is applied to the two wheels so as to rotate the driving-wheel A when the pedal-cranks are turned.

The construction for the cord-wheels is shown in the remaining figures, in which the entire wheel is designated by the letter B or D, while the various parts of the wheel are designated by small letters $f$ to $k$, inclusive.

The smaller cord-wheel is shown in Fig. 3 with hub $h$ threaded internally to screw upon the end of the ball-bearing sleeve in the center of the driven wheel A', such thread securing the hub without weakening the same.

The sheet-metal rings are formed upon their inner edges respectively with flat flanges $f$ and $f'$, from which outwardly-flared extensions $f^2$ and $i$ are projected and formed, as shown in Figs. 2 and 4, with alternate ridges $n$ and hollows $n'$. The flat portions of the ring are secured together and to a rivet-flange $g$ upon the hub by rivets $j$, while the flaring portions form a corrugated cord-channel, as shown in Fig. 4. With this construction the two rings may be identical and be stamped with the same die, the ridges and hollows being alternated when the rivet-holes are formed so as to be opposite one another when they are secured to the flange $g$.

The section of the corrugated channel in Fig. 3 is taken across a portion of the channel where the ridges and hollows are equidistant from the joint of the flanges $f f'$, but at the right-hand side of Fig. 5 a cross-section of the two rings is shown through the middle of one of the ridges, and both ridges and hollows are stamped from the metal of the rim within the margin so as to leave a peripheral guard-flange $k$ upon the ring, which runs perfectly true when the wheel is rotated. The edges of the rings upon the smaller cord-wheel B present a wavy outline, as is shown in Fig. 4, but the larger cord-wheel D, which is attached to the crank-shaft, is liable to contact with the clothing of the rider, and its margin is therefore provided with the guard-flanges $k$. These flanges make the margin run perfectly true and thus avoid engagement with the dress of the rider. In the sectional portion of Fig. 5 the corrugated groove lies between and inside of the flanges $k$, and the ridge is lettered $n$ and projects inside of the corrugated channel upon the upper side of the wheel, while the hollow is lettered $n'$ and projects outside of the flange upon the lower side of the wheel. The projection of the ridges and hollows from the plane of the flat flange $k$ upon the opposite sides of the same is about equal, so that the depression of the metal in the stamping operation is not excessive.

The upper ring in Fig. 5 is shown extended inwardly to the rivet-flange $g$ upon the wheel-hub $h$, thus forming a disk-wheel or plate-wheel, while the lower ring upon which the hollow $n'$ is shown is provided merely with a narrow flange $f'$ upon its inner edge and secured to the disk or plate $f$ by rivets $j$.

A brake-seat flange $k'$ with cylindrical periphery is extended outwardly from the annular rim $k$ of one of the corrugated rings to form an extended surface for applying a brake.

By making the wheel-plate rim and brake-flange integral of sheet metal the wheel is provided with a corrugated groove to receive a cord and with a seat to receive a brake-shoe with the smallest possible amount of weight. The walls of the corrugated groove being formed of sheet metal possess a sufficient degree of elasticity to yield as the strain increases upon the cord and to hold the same elastically. The operation of the wheel in holding the cord is thus more effective than where the groove is formed between rigid cast-metal surfaces. As the corrugations increase the stiffness of the sheet metal, it may be made very thin and a great degree of elasticity secured with the utmost diminution of weight in the structure.

The formation of the ridges $n$ and hollows $n'$ inside the periphery of the rings is clearly shown in Fig. 6, where the ridges and hollows are shaded so far as they are bent inwardly and outwardly from the plane of the ring.

I am aware that corrugated wheels have been constructed in a variety of ways to use with endless cords, and I do not therefore make any claim, broadly, to such a construction. I have devised the constructions which are described herein for the application of cord-driving wheels to a bicycle and find that they effect a very great reduction of the weight in the driving-gear as it is commonly constructed with a chain and sprocket-wheels.

What I claim as my invention is—

1. The bicycle cord-driving wheel B, formed with the hub $h$ threaded internally to screw upon the ball-bearing sleeve of a bicycle-wheel and provided with annular rivet-flange $g$, the sheet-metal rings formed respectively with flat flanges $f$ and $f'$, and with flaring corrugated flanges $f^2$ and $i$, the flanges $f, f'$, being attached to the flange $g$ by rivets $j$, and the ridges $n$ and hollows $n'$ upon the corrugated flanges being arranged alternately to form a corrugated cord-channel, as and for the purpose set forth.

2. The bicycle cord-driving wheel D, formed of a hub and two sheet-metal rings, the hub $h$ having annular rivet-flange $g$ thereon, one sheet-metal ring being formed with the disk $f$ attached to the flange $g$, and the other ring being formed with the flange $f'$ riveted to the disk $f$, the rings being flared to form a cord-channel and provided each at the edge with the true annular guard-flange $k$, and stamped within the periphery with the alternate ridges $n$ and hollows $n'$, such ridges and hollows being pressed partly into the channel between the flanges $k$, and partly outside of such flanges, to avoid straining the metal, substantially as herein set forth.

3. The bicycle cord-driving wheel D, formed of a hub and two sheet-metal rings, the hub $h$ having annular rivet-flange $g$ thereon, one sheet-metal ring being formed with the disk $f$ attached to the flange $g$, and the other ring being formed with the flange $f'$ riveted to the disk $f$, the rings being flared to form a cord-channel and provided each at the edge with the true annular guard-flange $k$, and one of said guard-flanges being provided with the integral outwardly-projecting cylindrical brake-seat $k'$, the rings being stamped within the periphery to form the corrugated cord-channel, with the alternate ridges $n$ and hollows $n'$ pressed partly into the channel between the flanges $k$ and partly outside of such flanges, as and for the purpose set forth.

In testimony whereof I have hereunto set my hand in the presence of two subscribing witnesses.

JOHN H. FOX.

Witnesses:
L. LEE,
THOMAS S. CRANE.